Dec. 27, 1966  O. L. KURTZ  3,293,989
TEMPLATE SYSTEM FOR MILLING MACHINES
Filed Aug. 9, 1965  3 Sheets-Sheet 1
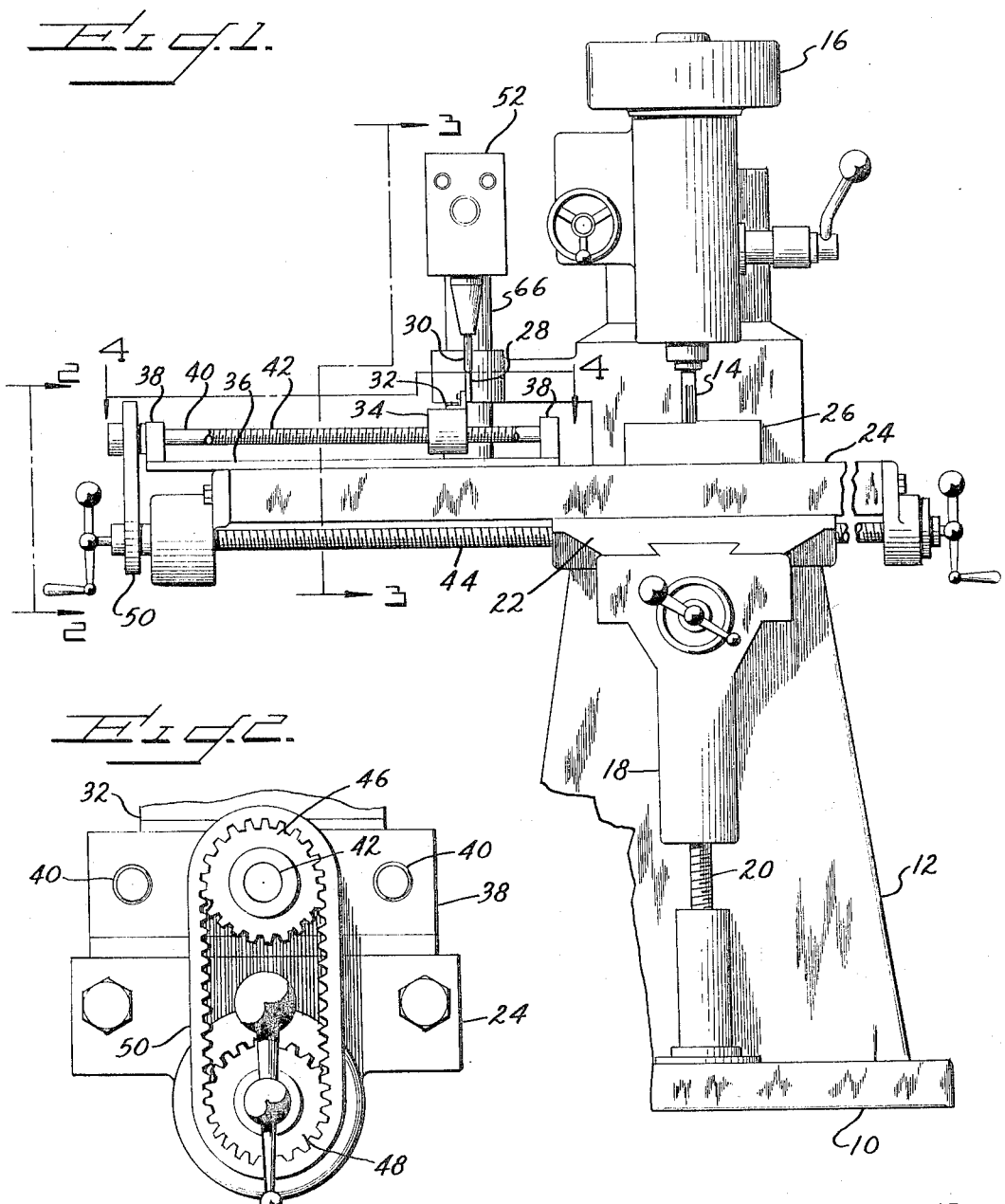
INVENTOR.
Oscar Louis Kurtz
BY Chapin & Neal
Attorneys

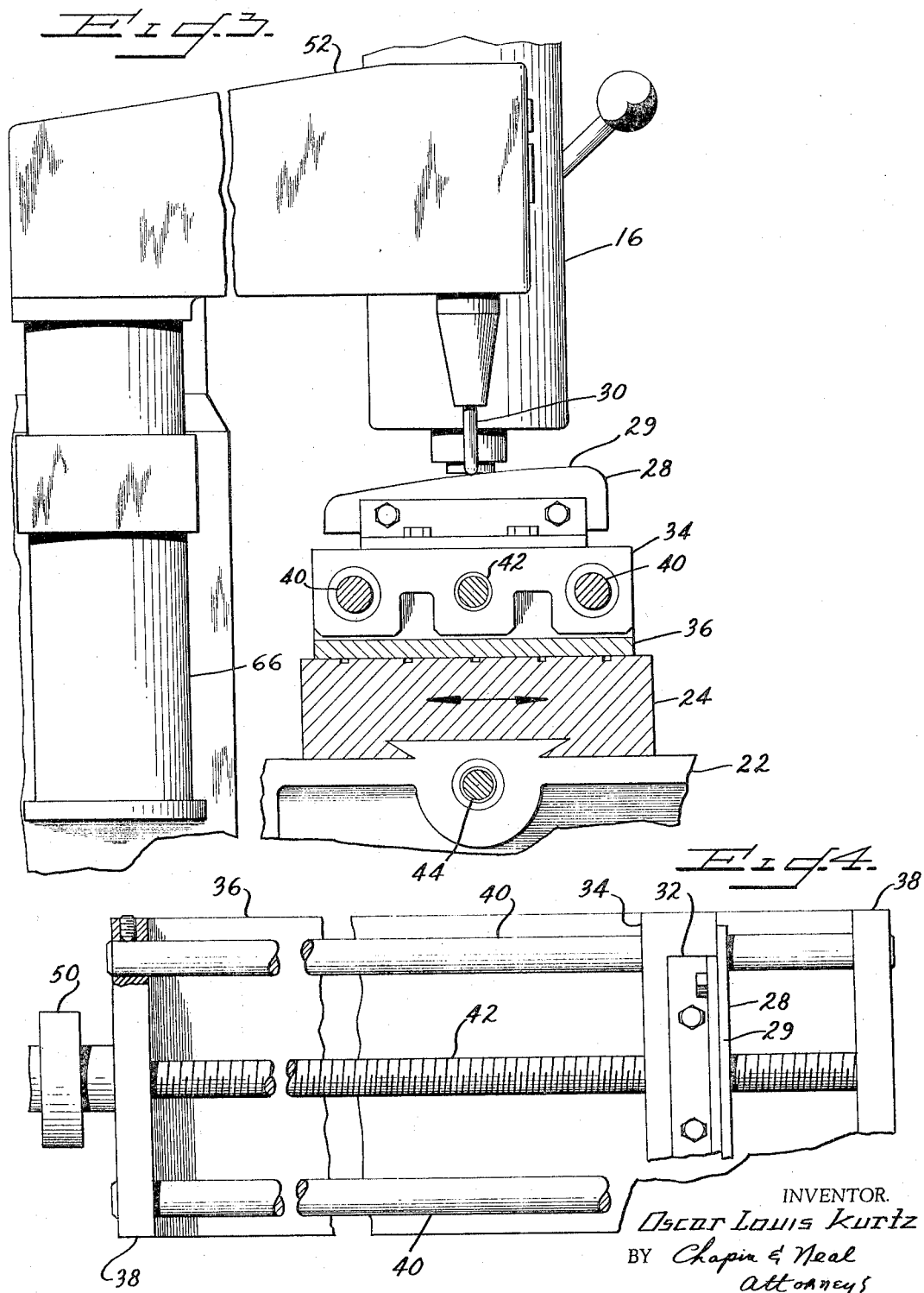

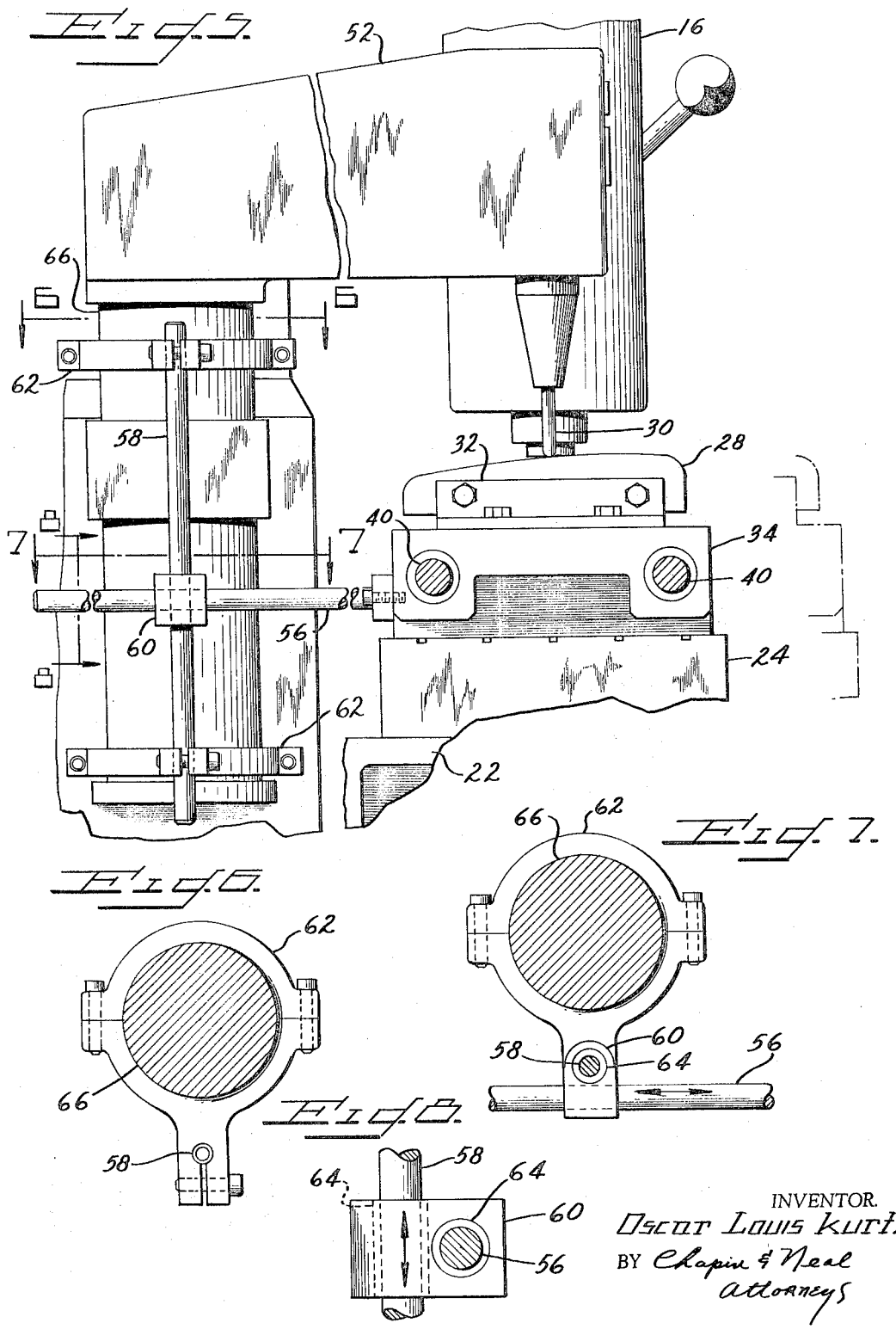

3,293,989
TEMPLATE SYSTEM FOR MILLING MACHINES
Oscar Louis Kurtz, Manchester, Conn., assignor to Kurtz Brothers, Incorporated, Manchester, Conn., a corporation of Connecticut
Filed Aug. 9, 1965, Ser. No. 478,383
13 Claims. (Cl. 90—13)

This invention relates to tracers and duplicators for machine tools, and in particular to a template-tracer system for use on three dimensional milling machines.

Heretofore, the use of tracers to produce a three dimensional shape mostly involved the use of a model or master having a complete surface configuration identical to the desired final surface contour of the part to be machined, hereinafter referred to as the workpiece. Such a system is disclosed in U.S. Patent No. 2,967,463, issued to Jensen. However, the fabrication of a model or master for use in three dimensional milling machines is difficult, costly and very time consuming. In addition, each time a change in contour is needed, a completely new model must, of course, be produced. If the above is considered together with the fact that in many cases extreme accuracy of machining is needed in the finished workpiece, then the cost and time factors become most significant in milling operations.

As concerns the problem of machining accuracy, it is well known by those skilled in the art that the longer the dimension over which a particular tolerance must be maintained, the more difficult is the tolerance holding problem. This problem is compounded where a full scale model or master must be produced from which the machining tolerances are taken.

While it is well known that many of the problems incident to the use of three dimensional models can be minimized by using a template having an edge profile corresponding to the desired finished cross section of the workpiece, insofar as is known, a commercially suitable template system for three dimensional milling machines has not heretofore been available. Notwithstanding the evident advantages of a template system in avoiding the necessity of accurately holding tolerances for a large surface, and the fact that template systems have been disclosed for various types of machines, such as in Armytage Patent No. 3,055,274, nevertheless, these systems are not suitable and have not been utilized in three dimensional milling machines in which the milling is controlled by highly accurate and sensitive tracer mechanisms. An illustrative example of the type of milling machine with which the invention may be used is disclosed in U.S. Patent No. 2,967,463, issued to Jensen. Commercially available machines of this type include the 2UVR and 2VG mills with Scan-o-matic tracer units manufactured and sold by the Tree Tool and Die Works, Racine, Wisconsin.

Therefore, the principal object of this invention is to provide simple but effective template duplicating system for machining three dimensional objects where the cross sectional configuration of the object remains constant throughout one dimension.

A further object of this invention is to provide an assembly whereby a unitary template can be utilized with a standard three dimensional milling machine with stylus tracer unit, thereby not only minimizing the cost and time involved in model fabrication, but also providing a relatively simple assembly, which in no way interferes with the extreme accuracy and inherent capabilities of the machine.

Another object of this invention is to provide a template system of the above type for attachment to a complex tracer-milling machine without modification, alteration or change over of the tracer stylus or milling machine assembly itself.

The above and other related objects and features of the invention will be apparent from a reading of the following description, and the disclosure found in the accompanying drawings with the novelty thereof pointed out in the appended claims.

In the drawings:

FIG. 1 is a front elevational view of a milling machine embodying the present invention;

FIG. 2 is an end view of the template assembly as seen along line 2—2 in FIG. 1;

FIG. 3 is a sectional view taken generally on the line 3—3 in FIG. 1 showing a general embodiment of the invention;

FIG. 4 is a top view of an embodiment of the present invention as seen generally on the line 4—4 in FIG. 1;

FIG. 5 is a sectional view taken generally on the line 5—5 in FIG. 1 showing an alternate embodiment of the invention;

FIG. 6 is a sectional view on an enlarged scale taken along the line 6—6 in FIG. 5;

FIG. 7 is a sectional view on an enlarged scale taken along the line 7—7 in FIG. 5; and FIG. 8 is a sectional view on an enlarged scale taken generally along the line 8—8 in FIG. 5.

Referring to FIG. 1 for a general description of the present invention, column 12 rising from base 10 of the milling machine supports spindle and cutter 14 which is mounted vertically for adjustment and is driven by known means 16. The machine bracket or knee 18 is slidably mounted on the column and movable vertically by the action of an elevating screw 20 extending from the base into the knee. This is known in the art as the vertical feed.

A saddle 22 is slidably mounted on the knee 18 for movement toward and away from the column 12, known as transverse feed. A table 24 is slidably mounted on the saddle 22 for right and left movement as shown in the drawings; this is known as longitudinal feed. The above structure identifies the usual vertical spindle milling machine, and while no further description of such known structure is required for a complete understanding and appreciation of this invention, reference to further details on milling machines in general may be helpful.

Referring now to FIGS. 1, 2, 3 and 4, the preferred embodiment of the invention will be described. As can be seen from the drawings and a knowledge of the art, a workpiece 26 located on and secured to the table 24, is carried by the table 24 in response to the tracer device 52 which is in registration with a template 28 having an edge 29, FIG. 3, machined to correspond to the transverse cross sectional configuration to be milled on the workpiece 26. The template 28 in turn is mounted on a template carrier 34 by a template mounting plate or brace 32.

Means is provided to position the template 28 under tracer stylus 30 and to null the longitudinal movement of the table 24. As shown, this includes a template base 36 mounted on and secured to the table 24. End plates 38, extending upwardly from both ends of the template base 36 are adapted to support in spaced parallel relation two guide rods 40 and a follower screw 42. The rods provide a track or slideway for movement of the carrier by rotation of screw 42. The template carrier 34 is in turn bored so as to slidably receive the smooth surfaced guide rods 40 and threaded to mesh with the follower screw 42. The rods and follower screw are disposed parallel to the longitudinal feed screw 44 of the milling machine and are of sufficient length to accommodate the full stroke of the machine as will be hereinafter described.

In operation of the system, the stylus 30 of the tracer sensing device 52 is initially disposed at one end of the template 28. The cutting tool 14 is also initially disposed at the corresponding location of the workpiece 26 and cuts during longitudinal movement of the table 24. Ordinarily, a model or master would also be carried by the table, but in accordance with this invention, the effect of the movement of the table 24 on the template 28 must be nulled when the cut is being made, since the table also carries the template. In order to do this, the template carrier 34 is screw mounted on the longitudinal follower screw 42 which is driven in response to rotation of the longitudinal feed screw 44. This is accomplished by suitable means such as a gear unit, as shown in FIG. 2, wherein the follower screw gear 46 is connected in a 1/1 ratio with the feed screw gear 48 through the use of a cog belt 50 or similar power transmission means. By this arrangement, when the worktable 24 is moved in a longitudinal direction by the rotation of the longitudinal feed screw 44, the follower screw 42 is also rotated thereby moving the template carrier 34 in the opposite direction to the movement of the worktable 24. Thus, the template 28 is maintained in continuous registration with the tracer stylus 30. It is to be understood in this embodiment, that the feed screw 44 and the follower screw 42 should be of the same pitch and thread so as to permit proper operation.

Upon a full cut by the tool 14 across the workpiece 26, the table 24 indexes in a transverse direction, as shown by the arrow in FIG. 3, thereby carrying the template 28 to a new position under the stylus 30 which maintains continuous registration and contact with the template throughout the next cutting sequence of the table. This procedure continues until the entire edge profile of the template 28 has been scanned by the stylus 30 and cut in the workpiece 26. In effect, this template system integrates the narrow template edge into a complete surface contour.

An alternate embodiment of this invention is shown in FIGS. 5, 6, 7 and 8, showing another method of nulling the movement of the table 24 on the template 28.

It will be seen in FIG. 5, that the follower screw 42 of FIG. 1 is no longer present, rather the template carrier 34 is arrested relative to the longitudinal movement of the table 24 through the use of an arresting or stabilizer rod or bar 56 attached to said template carrier 34. One end of this rod 56 is slidably supported in a two-way housing or support 60 which allows for a transverse movement of the table 24, such as in the indexing step described earlier. In turn, the housing 60 is also slidably mounted on a vertical guide rod 58 which is disposed in perpendicular relationship to the stabilizer bar 56. This latter mounting allows for vertical movement by the table 24. The housing 60 is further illustrated in FIG. 8 wherein the relationship between the stabilizer bar 56 and the vertical guide rod 58 is more clearly seen. It will be noted that anti-friction type bearings 64 are also employed in the housing 60 so as to allow free and easy movement of both the housing and the bar in their respective directions. For purposes of holding the vertical guide rod 58 in an upright position, two support collars 62, one upper and one lower, are attached to the tracer sensing device frame 66 and in turn the ends of the vertical guide bar 58 are secured. See FIGS. 6 and 7.

In this embodiment, as in the preferred embodiment, it will be noted that the template 28 will be maintained in a position directly under the stylus 30, and in registration with the same throughout a longitudinal movement of the table 24; however, here it is the arresting action of the rod or bar 56 which causes the template carrier 34 to slide on the guide rods 40 which provide a track or slideway for movement of the carrier. Thus in both embodiments, means is provided for nulling table movement on the template in a direction perpendicular to the plane of the template.

Although the apparatus has been described above, in connection with a set-up encompassing cuts of a longitudinal nature, it will be obvious to those skilled in the art, that the invention is equally adapted for use with a machine set-up wherein the cutting stroke is through the transverse movement of the table.

Even though this invention has been illustrated as applied to a milling machine, its application on other similar machine tools should be quite clear. Therefore, it is to be understood that no limitations on this invention are intended other than may be imposed by the scope of the appended claims.

Having thus described the invention, what is claimed is:

1. An attachment for a three dimensional milling machine having a tracer sensing device with a tracer stylus and a movable worktable actuated in response to said tracer sensing device, said attachment comprising a template having an edge corresponding in contour to a desired finished surface of a workpiece, said edge of said template being positioned in substantially perpendicular relation to the longitudinal movements of said worktable, a template carrier, means to support said template carrier in movable relation to said worktable, and means engageable with said carrier for moving said carrier on said support means in an opposite direction in relation to and in response to the longitudinal movements of said worktable, thereby maintaining continuous registration of said template with said tracer stylus.

2. An attachment for a three dimensional milling machine having a tracer sensing device with a tracer stylus and a movable worktable actuated vertically, transversely and longitudinally in response to said tracer sensing device, said attachment comprising a template having an edge corresponding in contour to a desired finished surface of a workpiece, said edge of said template being positioned in substantially perpendicular relation to the longitudinal movements of said worktable, a template carrier, means to support said template carrier in movable relation to said worktable, said means including a carrier slideway mounted on said worktable and movable therewith, and means engageable with said carrier for moving said carrier on said carrier slideway in an opposite direction in relation to and in response to the longitudinal movements of said worktable, thereby maintaining continuous registration of said template with said tracer stylus.

3. An attachment for a three dimensional milling machine having a tracer sensing device with a tracer stylus and a movable worktable actuated vertically, transversely and longitudinally in response to said tracer sensing device, said attachment comprising a template having an edge corresponding in contour to a desired finished surface of a workpiece, said edge of said template being disposed in substantially perpendicular relation to the longitudinal movement of said worktable, a template carrier, means to support said template carrier in movable relation to said worktable, said means including a carrier slideway mounted on said worktable and movable therewith, and means engageable with said carrier for moving said carrier on said carrier slideway in an opposite direction in relation to and in response to the longitudinal movement of said worktable, said means including a follower screw threadedly engaged with said template carrier and means for driving said follower screw, thereby maintaining continuous registration of said template with said tracer stylus.

4. An attachment for a three dimensional milling machine having a tracer sensing device, a tracer stylus in said tracer sensing device and a movable worktable actuated in response to said tracer sensing device, said attachment comprising a template having an edge corresponding in contour to a desired finished surface of a workpiece, said edge of said template being positioned in substantially perpendicular relation to the longitudinal movement of said worktable, a template carrier, means to support said template carrier in movable relation to said worktable, said means including a carrier slideway comprising a base mounted on said worktable and movable therewith, upwardly extending portions, and guide rods supported by said base in spaced parallel relation to one another and to said worktable, said template carrier being slidably disposed on said guide rods, means engageable with said carrier for moving said carrier on said guide rods in a direction opposite the longitudinal movement of said worktable, said means including a follower screw supported in parallel relation to said guide rods by said base and threadedly engaged with said template carrier, and means for driving said follower screw in response to the longitudinal feed screw of said worktable, thereby maintaining continuous registration of said template with said tracer stylus.

5. An attachment for a three dimensional milling machine having a tracer sensing device with a tracer stylus and a movable worktable actuated in response to said tracer sensing device, said attachment comprising a template having an edge corresponding in contour to a desired finished surface of a workpiece, said edge of said template being positioned in substantially perpendicular relation to longitudinal movement of said worktable, a template carrier, means to support said template carrier for movement parallel to the longitudinal movement of said worktable, and means engageable with said carrier for arresting longitudinal movement of said carrier on said support means relative to said worktable to maintain continuous registration of said template with said tracer stylus.

6. An attachment for a three dimensional milling machine having a traver sensing device, a tracer stylus in said tracer sensing device and a movable worktable actuated in response to said tracer sensing device, said attachment comprising a template having an edge corresponding in contour to a desired finished surface of a workpiece, a template carrier for supporting said template in a plane perpendicular to the cutting stroke of said machine, a track for said carrier to provide movement thereof relative to said worktable, means engageable with said carrier for arresting longitudinal movement of said carrier on said track in a direction perpendicular to the plane of said template, thereby maintaining continuous registration of the edge of said template with said tracer stylus.

7. An attachment for a three dimensional milling machine having a tracer sensing device, a tracer stylus in said tracer sensing device and a movable worktable actuated in response to said tracer sensing device, said attachment comprising a template having an edge corresponding in contour to a desired finished surface of a workpiece, said edge of said template being positioned in substantially perpendicular relation to the longitudinal movement of said worktable, a template carrier, means to support said template carrier in movable relation to said worktable, said means including a carrier slideway mounted on said worktable and movable therewith, means engageable with said carrier for arresting longitudinal movement of said carrier on said carrier slideway relative to said worktable, said means including a bar disposed in a plane parallel to said worktable and connected at one end to said template carrier and means for stabilizing said bar relative to said carrier despite vertical and transverse movement of said worktable, thereby maintaining continuous registration of said template with said tracer stylus.

8. An attachment for a three dimensional milling machine having a tracer sensing device, a tracer stylus in said tracer sensing device and a movable worktable actuated in response to said tracer sensing device, said attachment comprising a template having an edge corresponding in contour to a desired finished surface of a workpiece, said edge of said template being positioned in substantially perpendicular relation to the longitudinal movement of said worktable, a template carrier, means to support said template carrier in movable relation to said worktable, said means including a carrier slideway comprising a base mounted on said worktable and movable therewith, upwardly rising end plates disposed at both ends of said base, and guide rods supported in spaced parallel relation to one another and to said worktable by said end plates, said template carrier being slidably disposed on said guide rods, means engageable with said carrier for arresting longitudinal movement of said carrier on said guide rods relative to said worktable, said means including a stabilizer bar disposed in a plane parallel to said worktable and connected at one end to said template carrier, and means for permitting vertical and transverse movement of said template carrier with said worktable wherein said means include a housing slidably mounted on said stabilizer bar and also slidably mounted on a vertical guide rod secured to the frame of said tracer sensing device and disposed in perpendicular relation to said stabilizer bar, thereby maintaining continuous registration of said template with said tracer stylus.

9. An attachment for a three dimensional milling machine having a tracer sensing device with a tracer stylus, and a movable worktable actuated vertically, transversely and longitudinally in response to said tracer sensing device, said attachment comprising a template carrier for supporting a template having an edge corresponding in contour to a desired finished surface of a workpiece, said template carrier supporting said template in a position wherein said edge of said template is in substantially perpendicular relation to the longitudinal movement of said worktable, means to support said template carrier in movable relation to said worktable, and means engageable with said carrier for moving said carrier on said support means in an opposite direction in relation to and in response to the longitudinal movement of said worktable, thereby continuously maintaining said carrier under said tracer stylus.

10. An attachment for a three dimensional milling machine having a tracer sensing device with a tracer stylus, and a movable worktable actuated vertically, transversely and longitudinally in response to said tracer sensing device, said attachment comprising a template carrier for supporting a template having an edge corresponding in contour to a desired finished surface of a workpiece, said template carrier supporting said template in a position wherein said edge of said template is in substantially perpendicular relation to the longitudinal movements of said worktable, means to support said template carrier in movable relation to said worktable, said means including a carrier slideway mounted on said worktable and movable therewith, and means engageable with said carrier for moving said carrier on said carrier slideway in an opposite direction in relation to and in response to the longitudinal movements of said worktable, said means including a follower screw threadedly engaged with said template carrier and means for driving said follower screw, thereby continuously maintaining said carrier under said tracer stylus.

11. An attachment for a three dimensional milling machine having a tracer sensing device with a tracer stylus, and a movable worktable actuated vertically, transversely and longitudinally in response to said tracer sensing device, said attachment comprising a template carrier for supporting a template having an edge corresponding in contour to a desired finished surface of a workpiece, said template carrier supporting said template in a position wherein said edge of said template is in substantially perpendicular relation to the longitudinal movements of said worktable, means to support said template carrier in movable relation to said worktable, and means engageable with said carrier for arresting longitudinal movement of said carrier on said support relative to said worktable, thereby continuously maintaining said carrier under said tracer stylus.

12. An attachment for a three dimensional milling machine having a tracer sensing device with a tracer stylus, and a movable worktable actuated vertically, transversely and longitudinally in response to said tracer sensing device, said attachment comprising a template carrier for supporting a template having an edge corresponding in contour to a desired finished surface of a workpiece, said template carrier supporting said template in a position wherein said edge of said template is in substantially perpendicular relation to the longitudinal movements of said worktable, means to support said template carrier in movable relation to said worktable, said means including a carrier slideway mounted on said worktable and movable therewith, means engageable with said carrier for arresting longitudinal movement of said carrier on said carrier slideway relative to said worktable, said means including a stabilizer bar disposed in a plane parallel to said worktable and connected at one end to said template carrier and means for permitting vertical and transverse movement of said template carrier with said worktable, thereby continuously maintaining said carrier under said tracer stylus.

13. Attachment for multi-dimensional machine tools having a tracer sensing device with a tracer stylus and a movable worktable, said attachment comprising a carrier mounted on said worktable for supporting a template having an edge corresponding in contour to a cross section of a workpiece, means for nulling on said carrier, the effect of movement of said worktable in a direction generally perpendicular to a plane containing the edge of said template when supported by said carrier.

References Cited by the Examiner
UNITED STATES PATENTS 2,923,518  2/1960  Goodrich _____ 90—62

ANDREW R. JUHASZ, *Primary Examiner.*

WILLIAM W. DYER, Jr., *Examiner.*

G. A. DOST, *Assistant Examiner.*